Sept. 19, 1961 G. I. WILLIAMS 3,001,180

DATA REVOLVING

Filed Aug. 23, 1954 2 Sheets-Sheet 1

INVENTOR
GERALD I. WILLIAMS

BY Cushman, Darby & Cushman
ATTORNEYS

Sept. 19, 1961 G. I. WILLIAMS 3,001,180

DATA REVOLVING

Filed Aug. 23, 1954 2 Sheets-Sheet 2

INVENTOR
GERALD I. WILLIAMS

BY Cushman, Darby & Cushman
ATTORNEYS

United States Patent Office 3,001,180
Patented Sept. 19, 1961

3,001,180
DATA REVOLVING
Gerald I. Williams, Roseville, Minn., assignor to Sperry Rand Corporation, a corporation of Delaware
Filed Aug. 23, 1954, Ser. No. 451,617
18 Claims. (Cl. 340—174.1)

This invention relates to methods and apparatus for storing and reproducing information or the like. The invention is mainly concerned with magnetic recording on the surface of rotating drums, and the following explanation will proceed in regard thereto. However, the invention is equally applicable to any erasable non-magnetic recording and may utilize any movable record member such as drums, disks, tapes or belts to carry the recording medium.

In U.S. Patent No. 2,540,654, issued February 6, 1951, to A.A. Cohen et al., there is described apparatus for recording magnetic spots or cells on the surface of an elongated magnetizable member which is adapted to be moved continuously in relation to various magnetic transducing heads. In a specific embodiment therein disclosed, the magnetizable surface is in the form of magnetic tape which is wrapped tightly about the periphery of a rotatable drum. The patent described how so-called binary magnetic spots, that is, spots having flux oriented in one of two possible directions, may be recorded upon, removed from, and altered in the message or intelligence tracks of the drum. These spots represent binary digital signals with one value representing "1" and the other value indicating "0." It is explained how either discrete or non-discrete signals may be used in recording the spots. In the so-called non-return-to-zero type of pattern, a series of flux notations of the same character may be blended into one another to form a continuous flux field in one direction. The flux shifts to the opposite direction to indicate the other binary character and remains in that direction until the recurrence of the first binary character; whereas in return-to-zero reading, the flux remains in the 0 direction but shifts momentarily to the other level to indicate a 1.

This invention relates to but is not restricted to the techniques described in the above-cited Cohen Patent 2,540,654. The rotating magnetic drum as disclosed therein has proved itself to be a satisfactory storage medium for an electronic data or information processing system with respect to speed, capacity, reliability and economy. While the magnetic drum is generally thought of as providing only medium access time, it can provide data rather quickly where the data may be arranged on the drum so as to be available for playback at the instant it is required (so-called minimum access programming), or where the data can be played back a short time before it is needed and held in a drum revolver.

A drum revolver or recirculation system in its simplest form consists of a writing transducer and a reading transducer mounted along the same track. An example and application of this type revolver may be found in the copending application of John L. Hill, Serial No. 431,108, filed May 20, 1954. Data recorded on the track by the writing transducer is fed back thereto through the reading transducer and so can be read-out to the data processing equipment in the time required for the drum to move through the angle subtended by the two transducers. To keep this recirculation synchronized with the timing of the system, the two transducers must be separated by an integral number of cell spaces, less a short distance to allow for delays inherent in the reading and recording operations.

Since it is impractical to fabricate a shroud for the drum such that two transducers may be fixedly mounted at a precise separation, one of the transducers may be adjustable in a tangential or circumferential direction. Suitable mounts are described in the copending application of Robert L. Perkins, Serial No. 421,573, filed April 7, 1954, now Patent No. 2,864,892. In using tangentially adjustable mountings, the writing and reading transducers ordinarily have a minimum separation in the order of 100 or more cell spaces, and an interval equal to the time required for 100 cell spaces to pass a reading transducer cannot be truly termed rapid access.

It is accordingly an object of this invention to provide an improved revolver or recirculation system which is capable of rapid access storage.

It is a further object of this invention to provide a drum revolver, the recirculation time of which is independent of the minimum spacing at which adjacent transducers may be mounted.

More generally, it is the object of this invention to provide, for use with any recording medium such as a drum, tape, disk or belt, a revolver which can recirculate data at any desired rate.

Further objects and advantages of this invention will become more fully apparent from the following description and accompanying drawings in which.

Figures 1, 2, 13:
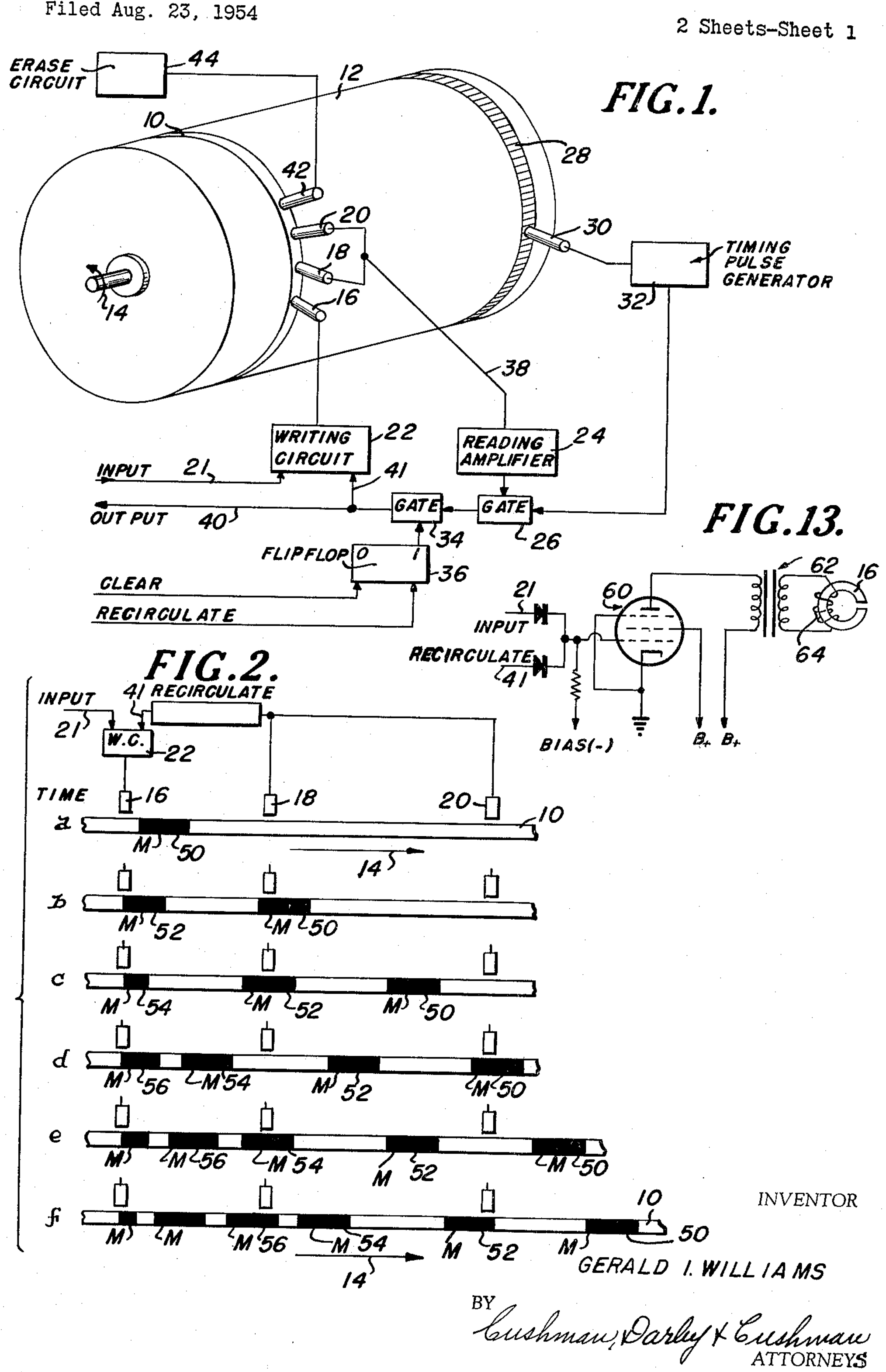
FIGURE 1 is a diagrammatic layout of a representative embodiment of this invention.
FIGURE 2 illustrates the loading of a revolver track at six progressive time intervals.
FIGURE 13 is a writing circuit suitable for use in conjunction with the embodiment illustrated in FIGURE 1.

With reference to FIGURE 1 showing an exemplary application of this invention, one track or record member 10 of a rotating magnetic drum 12 which is moving in a direction indicated by the arrow 14 is reserved for use as a data or information revolver track. Associated with track 10 are a single writing transducer 16 and two reading transducers 18 and 20. While any one of these three transducers may be fixedly mounted to the shroud of the drum (not shown), the other two are preferably adjustable either tangentially or circumferentially so that the three may be positioned at precise distances from each other as will be explained below.

Information in the form of input signals on line 21 is recorded on revolver track 10 by means of writing circuit 22 and writing transducer 16 and is fed back via reading transducer 18 and reading amplifier 24 to enable gate 26 to which are applied timing pulses generated from timing track 28 by means of reading transducer 30 and timing pulse generator 32. Hence, for each "1" read by transducer 18, a timing pulse will issue from gate 26 and pass through gate 34 to cause a "1" to be rewritten on track 10, providing gate 34 is enabled by flip-flop 36.

The circuit components indicated in the boxes just referred to and shown in FIGURE 1 may take a number of well known forms. For example, the reading amplifier, two-input gate and flip-flop are shown and described in U.S. Patent 2,614,169, October 14, 1952, to Cohen et al., while means for generating timing pulses are specified in Cohen Patent 2,540,654. A suitable writing circuit is shown in FIGURE 13 and will be described below.

After the periphery of the drum moves through the distance by which reading transducer 20 is separated from writing transducer 16, the former will also initiate recirculation of the signals through lead 38 which it shares with reading transducer 18. The signals then recirculate through both reading transducers 18 and 20 to provide a continuous output on lead 40 and a recirculated input on lead 41 until gate 34 is disabled by the resetting of flip-flop 36 to its "0" position.

The magnetic spots may be erased when they pass under erase head 42 which may or may not operate continuously. In certain instances it is desirable to energize the erase circuit 44 only in clearing revolver track 10, because this insures that the information will not be erased in the event of power failure. On the other hand, a continuous erase allows the rest of the track to be used to mount other revolvers and is more economical of equipment.

This invention may be more readily understood with reference to a specific example. Let it be assumed that signals may be recorded in 100 cells per inch of track, that the smallest separation at which two transducers may be mounted along a single track is two inches, but that it is desired to recirculate a message or certain information each time the drum moves through a distance occupied by 100 cells. It will be appreciated that a message more than 100 bits (binary digits) in length cannot be recirculated at this rate. Reading transducer 18 may be mounted a distance equal to 200 cells from writing transducer 16 in the direction toward which the drum is rotating and transducer 20 may be located another 300 cells further down the track from reading transducer 18.

In this example, the distance or related time interval between the writing transducer 16 (i.e., the point at which it writes a piece of information onto the record member) and the "downstream" first point of reading as by reading transducer 18, may be considered of numerical value X; whereas the distance or delay time for the writing point to the second reading point indicated by reading transducer may be considered $2X+Y$. Then, in accordance with this invention, X and Y, after each is divided by their largest common whole number factor, result in two numbers which are relatively prime. In this example, the second reading head is spaced a distance $X+Y$ from the first reading head 18, which in turn is spaced from the writing head a distance X as above indicated. However, as will be later apparent, the reverse situation of the first reading head 18 being a distance $X+Y$ from writing head 16 and a distance X from the second reading head 20, may be employed.

The manner in which the information or message M is recirculated may best be understood with reference to FIGURE 2 which shows six views of track 10 in the vicinity of the transducers at progressive time intervals. FIGURE 2 at time (*a*) shows track 10 immediately after the message M is originally recorded. It may occupy approximately 70 consecutive cell spaces which are indicated generally by the character 50. At time (*b*), the track has moved a short distance in the direction 14 and the message is being rewritten as it is being recirculated through reading transducer 18 to occupy a segment 52 of track 10. Each character in the message written in track segment 52 is 200 cell spaces behind the corresponding character in track segment 50. The message is rewritten at time (*c*) in track segment 54 by recirculation through transducer 18 and again in segment 56 at time (*d*), this time through second reading transducer 20. It will now be seen that the digits recorded in track segment 56 are only 100 cells behind those in segment 54. Consideration of FIGURE 2 at times (*e*) and (*f*) will show that the message M will be recirculated each time the drum moves through 100 cell spaces, with reading transducers 18 and 20 playing back corresponding digits simultaneously.

Suppose that it is desired to recirculate information or a message each time the drum moves through the angle subtended by $n$ consecutive cells on revolver track 10. The first reading transducer 18 is positioned at a distance $d$ from the writing transducer 16 so that when $d$ is expressed by a number of cell spaces, the ratio $d:n$ is the smallest possible integer. The second transducer 20 is then positioned at a distance $d+n$ from reading transducer 18 or at a distance $2d+n$ from writing transducer 16. The minimum possible spacing between transducers may be termed $d_{\text{minimum}}$ or $d_m$.

At this point it should be mentioned that, of course, the minimum length of $n$ in a particular case is the length of the message M. However, M need not be the full length of $n$.

In order to determine the distance $x$ through which the drum rotates before continuous recirculation is achieved, the equation $$x=2d\left(\frac{d}{n}-1\right)$$

may be used. In the specific example illustrated in FIGURE 2, the establishment of continuous recirculation for the case of $n$ equal to 100 cell spaces where the minimum head spacing $d_m$ was 200 cells ($d_m$ in this case by coincidence being equal to $d$), required the drum to move through 400 cell spaces. To obtain continuous recirculation every 30 cells, where two transducers can be mounted at a spacing of 180 cell spaces, requires a delay of 1800 cell spaces or less than a complete revolution of a six-inch diameter drum containing 100 cells to the inch. Programming of the data processing system to allow for a delay of this extent would not ordinarily involve any difficulty.

In the general case, the second reading transducer 20 may be positioned from the recording transducer 16 not only a distance $2d+n$ but also at any distance $bd+an$ where $b$ is any integer 1 or larger than 1 and $a$ is any integer 1 or larger. However, the distance $x$, through which the drum would necessarily rotate before continuous recirculation is achieved, is increased when either $b$ or $a$ is increased beyond its minimum value. The actual distance between the writing head 16 and first reading head 18 may also be a multiple of $d$. However, in this case $b$, the multiple of $d$ for the second reading head 20, would necessarily be increased by an amount equal to the multiple of $d$ for the first reading head 18.

It will be apparent that the general case as described above includes the specific case wherein the first reading transducer may be arbitrarily placed more than the minimum possible spacing $d_m$ plus any residual fraction of $n$ from the writing transducer, so that the second reading transducer may be in fact closer to the first reading transducer than is the first reading transducer to the writing transducer. (It is possible that $d_m$ might be equal to $n$.) Such a case is within the scope of the present invention. However, it would appear that the fill-up time would be unnecessarily lengthened.

FIGURES 4 through 11 show situations where $a$ and $b$ have been varied. The record member 10 shown only as a thin line has passed under the writing head 16 and reading heads 18 and 20 and progressed to the position shown in the different illustrations. The distance $x$ is the length of record from the starting point 23 to the point 25 at which continuous circulation at $n$ spacing begins.

Figures 4, 5, 6, 7, 8, 9, 10, 11, 12:
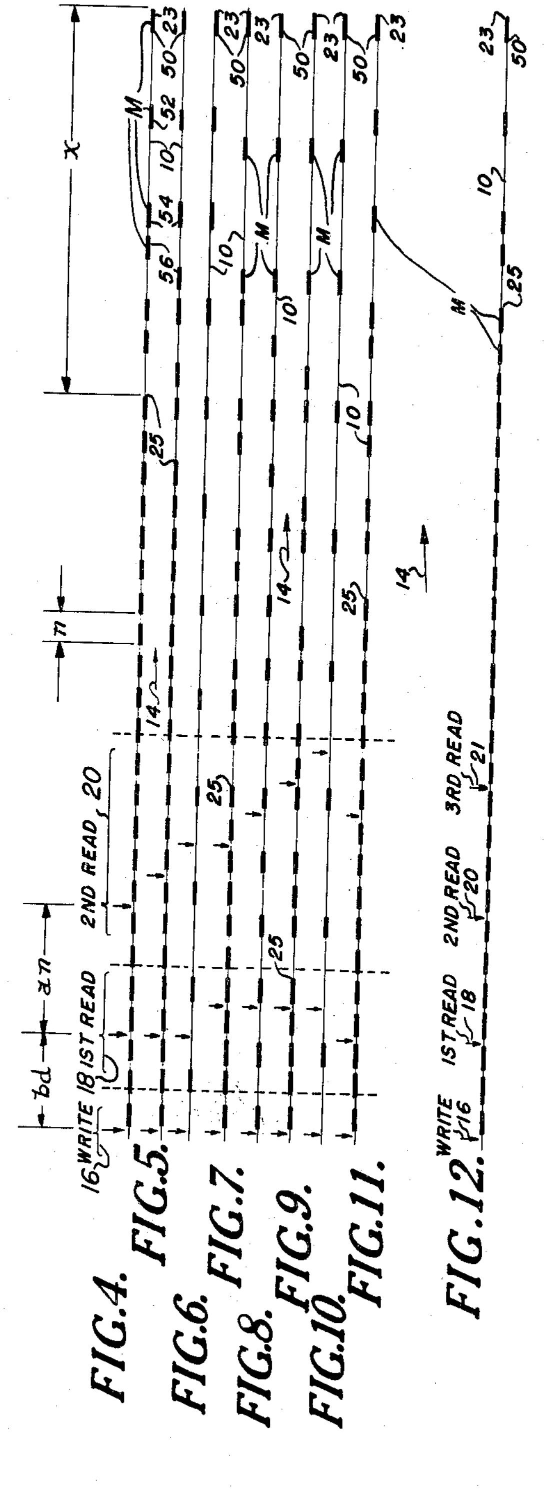
FIGURES 4 through 12 illustrates the build-up of the re-recorded information on a record member by reading means located at different positions.

FIGURE 4 exemplifies the case mentioned above where reading transducer 20 is set at a distance $2d+n$ and the system provides the shortest distance $x$. It will be noted that the distance $3n$ between the writing transducer and first reading transducer in this case is an odd multiple of $n$. In FIGURE 5 reading transducer 20 is advanced $1n$ so as to be set at $2d+2n$ and $x$ increases. In FIGURE 6 reader 20 is advanced to $2d+3n$, and since $3n$ equals $d$, no repetition at $n$ spacings is produced.

FIGURES 7 through 10 represent similar situations except the distance $d$ is an even multiple of $n$. Upon increasing the distance of the second reading transducer 20 by multiples of $n$, it will be noted in FIGURES 8 and 10 that where the multiple of $n$ is even, there is never an achievement of continuous repetition at $n$ spacings. However, when the multiple of $n$ is odd, the system operates as desired.

FIGURE 11 shows a case where the second reading transducer 20 is moved to a position $3d+n$ from the writing transducer 16 while the first transducer 18 remains at $d$. Again the distance $x$ is increased.

Figure 3:
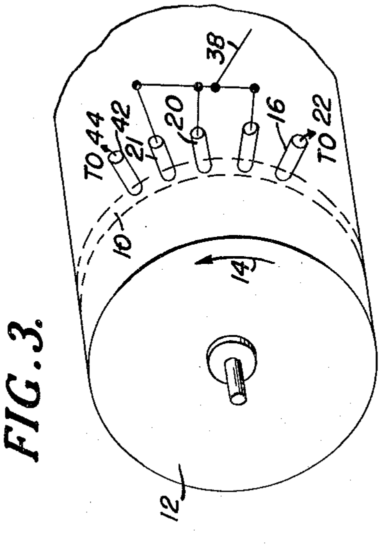
FIGURE 3 is a fragmentary view of the diagrammatic layout of FIGURE 1 showing a modification of the invention.

If the distance $x$ becomes critical even when the second reading transducer 20 is spaced at $2d+n$ from the writing transducer 16, it has been found that the addition of a third reading head 21 (FIG. 3) placed at a position further along the recording path in the direction of record movement will increase the rate of the progressive build-up; that is, the distance $x$ can in this manner be made even smaller than the value given by the equation $$x=2d\left(\frac{d}{n}-1\right)$$

For example, FIGURE 12 shows a specific instance wherein three reading transducers are employed. The spacing $n$ desired has been arbitrarily chosen as ⅓ units and since $d$ minimum in this case is 1 unit, the lowest possible integer of the fraction $$\frac{d}{n}$$

permits $d$ to be 1 unit. The second reading transducer 20 is set a distance from the writing transducer 16 of $2d+n$, and the third reading transducer 21 is placed from the writing transducer a distance $3d+2n$. The second and third reading transducers are then each separated from adjacent transducers a distance $d+n$.

The distance $x$ the record moved in FIGURE 12 before continuous recirculation was achieved equals 3 units, being only three-fourths the distance required for the tape to move if two reading heads had been employed as in FIGURE 4. By moving the third reading transducer 21 to a position $b_3d+a_3n$ where $b_3$ is any integer larger than 1 and $a_3$ is any even or odd integer, the distance $x$ may be shortened if necessary, to accommodate for the desired programming of the data processing system. The distance $x$ may also be varied in a three reading head combination by locating the second reading head 18 at a distance $b_2d+a_2n$ where $b_2$ is any integer larger than 1 and $a_2$ is any even or odd integer. The only other limitation on either $b_2$ or $b_3$ is such that the adjacent transducers are separated an amount equaling at least $d$ minimum.

Since $n$ may be desired to have a length varying from zero to $d$ minimum, it has been found the second reading transducer 20 in a two reading head combination would be required to cover a range along the record member 10 of nearly 3 times $d$ minimum. With the addition of a third reading head 21, however, the adjustment range of all reading transducers would be less than 2 times $d$ minimum.

Reference is now made to FIGURE 13 which details a writing circuit capable of the high speed writing action required in this invention. If a magnetic drum having 100 cells per inch of track is rotated to attain a peripheral velocity of 1600 inches per second, the writing circuit must be able to write a magnetic spot every 6 microseconds. The writing operation is initiated by positive signals on input line 21 or being recirculated to arrive on line 41. These positive pulses when applied to the control grid of pentode 60 cause that tube to conduct. The resultant pulse at the plate is applied to transformer 62 to energize the winding 64 of writing transducer 16. Since the binary 0 is represented by the absence of a pulse and the revolver track 10 is originally erased to the "0" condition, no means is required for writing 0's.

Figure 15:
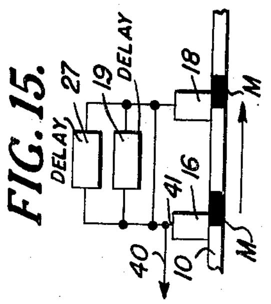
FIGURES 14 and 15 illustrate other modifications of the invention utilizing delay means.
Figure 14:
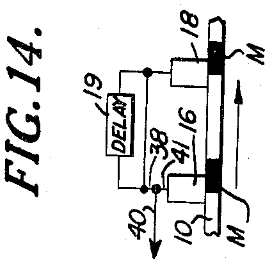

Although interleaving of the information, data blocks, or messages M has hereinbefore been explained by utilizing two or more reading transducers, it is within the scope of this invention to produce the same effect with only one reading transducer 18 (FIGURE 14) whose output is immediately fed back to the writing transducer 16 and also fed back through a predetermined delay 19. This delay could be timed to allow continuous circulation at the desired shortened access or repetitive spacing $n$. FIGURE 15 illustrates a similar type system except the delay 27 is added. If this delay were longer in time than delay 19, a situation analogous to the above-explained three reading head combination could be obtained. It would only be necessary to translate the distances calculated for the second and/or third reading heads, 20 and 21, respectively, into time according to the speed of the record member 10. FIGURES 14 and 15 exemplify the basic apparatus utilizing delay line means, but it should be understood that the reading amplifier 24, gates 26 and 34 with their enabler and writing circuit 22, all shown in FIGURE 1, may be employed therewith.

While this invention has been illustrated by a specific embodiment which utilizes the return-to-zero method of recording binary digital data, it is equally applicable to the non-return-to-zero pattern referred to hereinbefore and thoroughly explained in the above-mentioned Cohen et al. Patent 2,540,654.

This invention is also adaptable to other methods of digital recording, both magnetic and non-magnetic.

The specific embodiment of this invention has been discussed with reference to a single revolver, but a number of such revolvers may be operated in parallel if the data processing system so requires. If a limited number of tracks are available, a number of revolvers could share the same track. Provision could also be made to interlace several messages on the revolver track, if the timing of the data processing system so required. In this case a separate output would be required for each message, each output being controlled by correspondingly interlaced clock pulses.

It will be appreciated that many embodiments of this invention will occur to others, and applications may be made to non-cyclical and/or non-magnetic record members without departing from the scope thereof. For instance, this invention may be used to locate information on a magnetic tape, after which the tape is rewound to be ready for subsequent searches. For such an application, one or more tracks on the tape would conveniently be reserved for operation of the revolver. Where insufficient time was abailable for rewinding, a search could be made in the reverse direction if the transducing heads were capable of both recording and playback and were connected to the recirculation circuitry through a double-pole-double-throw switch.

Therefore, it is intended that the matter contained in the foregoing description and the accompanying drawings be interpreted as illustrative and not liimitative, the scope of the invention being defined in the appended claims.

What is claimed is:

1. An information recording system comprising a movable record member, means for writing information in a given path on said record member only once each time said information is received by the writing means, means for reading said information from said record path at the end of a given time interval which begins with the writing of said information, means coupling said reading means to the writing means whereby the information read by the reading means is re-written in said given path on the record member at the end of said given time interval, and means coupled between said record path and writing means for returning any written information in said path back to the writing means for rewriting thereof in said given path after a second time interval which begins with the writing of such information but which is greater than said given time interval, said given and second time intervals being related to cause information to be repeatedly re-recorded only once in each of successive discrete time periods each of which is less than said given time interval.

2. A system as in claim 1 wherein said reading means and said means for returning the information to the writing means together comprise a plurality of reading transducer devices each connected to drive the writing means and each positioned along the recording path of said record member at different distances from said writing means for continuously reading and re-recording said information within equal adjacent spacings of predetermined length, both of said transducers being connected to energize the recording transducer.

3. A system as in claim 2 wherein said plurality of reading transducer devices comprises three transducers and said different distances are so related that the two furthermost reading transducers are located according to the formula $bd+an$, where $d$ equals an integral division of the distance from the writing transducer to the nearest reading transducer, $b$ is an integer always larger than the multiple of $d$ determining the nearest reading transducer distance, and for the furthermost reading transducers being larger by the addition of at least the number one than $b$ for the center reading transducer where $a$ times $n$ for the furthermost transducer is larger than $d$, $a$ is an integer, $n$ equals said predetermined length of spacings, and $$\frac{d}{n}$$

is an integer.

4. A system as in claim 3 wherein the position of the first reading transducer is at the distance $d$, the center reading transducer is positioned at $b_2d+a_2n$, and the distance to the furthermost reading transducer is $b_3d+a_3n$, $a_2$, $a_3$, $b_2$ and $b_3$ being determined to effect a predetermined rate of change of said changing rate and to produce continuous recirculation of said information at $n$ spacings.

5. A system as in claim 1 wherein said coupling means comprises a direct connection between said reading and writing means and said returning means includes at least one delay means paralleling said direct connection for producing an interleaving effect of the re-recorded information on said record member.

6. A system as in claim 1 wherein the said returning means comprises a second reading means spaced along said path a given distance from the first mentioned reading means, and means interconnecting the second reading means with the writing means to drive the latter.

7. A system as in claim 1 wherein said second time interval is of duration $2X+Y$ and said given time interval has a duration of one of the following: X or $X+Y$; X and Y, after division of each of their largest common whole number factor, being two numbers which are relatively prime.

8. An information recirculation system comprising a plurality of simultaneously operating electrical signal revolvers each having a different signal cycling time and simultaneously sharing a common path from a first point to a second point "downstream," means for initially introducing a signal into said system at only a single point in one of said revolvers, said path effectively including a first delay line having a given signal delay time which is substantially the cycling time for the first of said revolvers, each remaining revolver having a return path different from that for any other revolver and connected between said second point in the cycling direction back to said first point and effectively including its own second delay line which has a delay time related to the first mentioned delay time to cause any signal initially introduced at said single point and simultaneously revolved by all the revolvers once during their respective different cycling times to appear after a predetermined time only once in each of successive time periods each of which is less in duration than the shortest of said cycling times.

9. A system as in claim 8 wherein said second point is timewise effectively located a time X from said first point by one of the said first and second delay lines and a time $X+Y$ from said first point by another of said first and second delay lines, X and Y, after division by their largest common whole number factor, being two numbers which are relatively prime.

10. An electrical signal recirculating system comprising a revolver path for completely revolving an electrical signal during a given cycling time, said path including means coupled from a first point in the path to a second point therein in the cycling direction for effectively causing the path to have said given cycling time and return coupling means for coupling said second point substantially instantly back to said first point, means for introducing said electrical signal into said path at only said first point whereby said signal is repeatedly cycled in the path, and at least a second return coupling means simultaneously operating with and shunting the first mentioned return coupling means for effectively delaying said signal after it arrives each time at said second point in its return to said first point, the arrangement being such that there are effectively at least two revolver paths, one being the one mentioned and the other being common thereto between said first and second points in the cycling direction and including the second return coupling means instead of the first mentioned return coupling means, the effective delay in the second return coupling means having a time value related to said given cycling time to cause said signal to pass said first point more often than once per said given cycling time.

11. A system for recording given information upon a movable record member comprising a single writing transducer associated with the record member for recording the said information in a given track thereon, at least two reading transducers each positioned along the said record member track at different predetermined distances from said writing transducer and in the direction of movement of the record member for reading the said information as recorded, and means connecting both of said reading transducers simultaneously operatively to the writing transducer for returning thereto the said infomation as read by both reading transducers, thereby allowing re-recording in said track of the said given information by said writing means and repeated revolving of said given information via said record track through both of said reading transducers and back to the writing transducer, the center one of the three recited transducers being spaced a distance X from one of the other two transducers and a distance $X+Y$ from the other of said two transducers where X and Y, after division of each by their largest common whole number factor, result in two numbers which are relatively prime, the arrangement being such that the said given information may be repeatedly recorded after a predetermined time in said track in each of successive discrete lengths thereof with each of said lengths being substantially shorter than the shorter of the distances X or Y.

12. A system as in claim 11 wherein said reading transducers are positioned along the recording path of the record member at said different distances predetermined to maintain the relationship $bd+an$ for the distance to one of the reading transducers from the writing transducer where $d$ equals an integral division of the distance from the writing transducer to another and closer reading transducer, $b$ is an integer larger than the multiple of $d$ determining the closer reading transducer distance, $a$ is an integer, $n$ equals the recording spacing, and $$\frac{d}{n}$$

is an integer.

13. A system as in claim 12 wherein said means to return said information includes generating means for producing synchronizing pulses, gating means adapted to receive the pulses and said information and coupled to said writing transducer for re-recording said information.

14. A system as in claim 13 wherein said means to return the said given information as read further comprises a second gating means adapted to receive the said information from said first mentioned gating means for permitting and stopping recirculation, flip-flop means enabling the second gating means during a desired period of recirculation time, and writing circuit means connected to the second gating means and to the writing transducer for control thereof, and an output line connected to said second gating means for obtaining the said given information at the desired access time.

15. A system as in claim 11 wherein the reading transducer located next to the writing transducer is positioned so that the lesser or least of said different predetermined distances is the minimum distance physically possible.

16. A system for revolving a block of data of up to length $n$ between reading and recording transducers where the spacing between a reading and recording transducer is $d$ or a multiple of $d$ and where two or more blocks of data each of up to said length $n$ may be fitted evenly into the distance $d$, the system comprising a record path, said recording transducer for writing said block of data at only one point along said path, said reading transducer positioned along said path to read said block of data at said distance $d$ or multiple of said distance $d$ from said recording transducer, means for returning the so read data to said recording transducer, a second reading transducer positioned along said path from said first mentioned reading transducer the distance $an$, where $a$ is an integer to read said block of data, and means for returning to said recording transducer the data read by said second reading transducer, to cause continuous re-recording of said block of data only once in each successive length $n$ of said path.

17. A revolver system as in claim 16 wherein X is the distance between the recording transducer and the first mentioned reading transducer and $a$ is any integral number which makes X divided by $an$ result in a whole number when there is an odd number of $n$'s per $d$, and is any odd integer when there is an even number of $n$'s per $d$.

18. A revolver system as in claim 16 wherein the first mentioned reading transducer is positioned at the distance $d$ from the recording transducer, and the second reading transducer is positioned at a distance $d+n$ from the first reading transducer.

References Cited in the file of this patent

UNITED STATES PATENTS

| | | |
|---|---|---|
| 2,672,944 | Minton | Mar. 23, 1954 |
| 2,674,660 | Ambrose | Apr. 6, 1954 |
| 2,680,239 | Daniels et al. | June 1, 1954 |
| 2,718,356 | Burrell et al. | Sept. 20, 1955 |
| 2,770,797 | Hamilton et al. | Nov. 13, 1956 |
| 2,845,609 | Newman et al. | July 29, 1958 |

OTHER REFERENCES

"Quick-Access Memory" in Instruments, March 1954, page 474 relied upon.